(12) United States Patent
Hotta et al.

(10) Patent No.: US 10,270,105 B2
(45) Date of Patent: Apr. 23, 2019

(54) INSULATOR AND FUEL CELL

(71) Applicant: TOYOTA JIDOSHA KABUSHIKI KAISHA, Toyota-shi, Aichi-ken (JP)

(72) Inventors: Yutaka Hotta, Toyota (JP); Tateki Takayama, Toyota (JP); Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 262 days.

(21) Appl. No.: 14/932,683

(22) Filed: Nov. 4, 2015

(65) Prior Publication Data
US 2016/0133951 A1    May 12, 2016

(30) Foreign Application Priority Data

Nov. 12, 2014   (JP) ................................. 2014-229809

(51) Int. Cl.
*H01M 8/2465* (2016.01)
*H01M 8/0247* (2016.01)

(52) U.S. Cl.
CPC ....... *H01M 8/0247* (2013.01); *H01M 8/2465* (2013.01); *H01M 2250/20* (2013.01); *Y02T 90/32* (2013.01)

(58) Field of Classification Search
CPC ........................... H01M 8/0247; H01M 8/2465
See application file for complete search history.

(56) References Cited

U.S. PATENT DOCUMENTS

| | | | |
|---|---|---|---|
| 5,939,219 A | 8/1999 | Jansing et al. | |
| 6,287,720 B1 | 9/2001 | Yamashita et al. | |
| 8,114,553 B2 * | 2/2012 | Hotta ................. | H01M 8/2475 429/507 |
| 2002/0034673 A1 | 3/2002 | Bisaka et al. | |
| 2006/0141326 A1 | 6/2006 | Artibise et al. | |
| 2007/0007141 A1 | 1/2007 | Maeda et al. | |
| 2010/0040923 A1 | 2/2010 | Kato | |
| 2010/0040925 A1 | 2/2010 | Hotta et al. | |
| 2010/0273083 A1 | 10/2010 | Yamamoto et al. | |
| 2013/0164646 A1 | 6/2013 | Kobayashi et al. | |
| 2014/0015000 A1 | 1/2014 | Nishiyama et al. | |
| 2015/0093670 A1 | 4/2015 | Kobayashi et al. | |

FOREIGN PATENT DOCUMENTS

| | | |
|---|---|---|
| CN | 103429634 A | 12/2013 |
| DE | 10 2006 029 511 A1 | 1/2007 |
| ID | 195 38 034 C1 | 1/1997 |

(Continued)

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

In order to improve a power density of a fuel cell and prevent a generation of a poor insulation, an insulator is provided, which is disposed between a current collector disposed in contact with one end of a stacked body having a plurality of stacked unit cells in stacking directions, and an end member disposed outside from the current collector in the stacking directions, and includes a plurality of insulator members, each having a sheet-like planar portion. The plurality of insulator members which are stacked onto each other by the planar portions thereof are disposed oppose to the current collector.

4 Claims, 2 Drawing Sheets

(56) References Cited

FOREIGN PATENT DOCUMENTS

| | | |
|---|---|---|
| JP | 6-60904 | 3/1994 |
| JP | H11-45811 A | 2/1999 |
| JP | 2002-124291 | 4/2002 |
| JP | 2006-332006 A | 12/2006 |
| JP | 2008-165993 A | 7/2008 |
| JP | 2008-251309 | 10/2008 |
| JP | 2010-140870 A | 6/2010 |
| JP | 2010-262769 A | 11/2010 |
| JP | 2013-018991 A | 1/2013 |
| PH | 10-270066 A | 10/1998 |
| WO | WO97/08763 A1 | 3/1997 |

* cited by examiner

INSULATOR AND FUEL CELL

CROSS-REFERENCE TO RELATED APPLICATIONS

This application claims priority to Japanese Patent Application No. 2014-229809, filed on Nov. 12, 2014, the contents of all of which are incorporated herein by reference in their entirety.

BACKGROUND

The present invention relates to an insulator used for a fuel cell.

JP2008-251309A proposes a fuel cell which secures an insulation resistance by disposing an insulator between a current collector and an end plate which are disposed at one end of a fuel cell stack.

Recently, a reduction in size of components which do not contribute to an output of the fuel cell is demanded in order to improve a power density (output energy per unit mass or unit volume) of the fuel cell. Since the insulator described above does not contribute to the output of the fuel cell, there is a request of reducing the thickness of the insulator while maintaining the thickness sufficient for securing an insulation distance. However, when reducing the thickness of the insulator, a poor insulation resulting from a generation of pinholes and a poor insulation resulting from mixing of conductive materials with the insulator material when manufacturing the insulator may occur. Note that the subject described above is common to a structure in which an insulator is disposed between an arbitrary end member disposed outside of one end of a fuel cell stack not limited to the end plate) and a current collector. The end member includes, for example, a pressure plate which presses the fuel cell stack accommodated in a case toward the current collector, in addition to the end plate.

SUMMARY

The present invention is made in order to address at least a part of the subject described above, and can be implemented in terms of the following aspects.

(1) According to one aspect of the invention, an insulator is provided, which is disposed between a current collector disposed in contact with one end of a stacked body having a plurality of stacked unit cells in stacking directions, and an end member disposed outside from the current collector in the stacking directions, and includes a plurality of insulator members, each having a sheet-like planar portion. The plurality of insulator members which are stacked onto each other by the planar portions thereof are disposed oppose to the current collector. According to the insulator of this aspect, since the plurality of insulator members, each having the sheet-like planar portion, are provided, the thickness of the insulator as a whole can be thinner by reducing the thickness of the planar portion of each of the insulator members, thereby improving a power density of a fuel cell when the insulator is used for the fuel cell. In addition, since the plurality of insulator members are disposed so as to be stacked onto each other by the planar portions thereof, generations of a pinhole, etc. in the insulator members at the same position when seen in the stacking direction can be prevented. Therefore, a generation of a poor insulation can be prevented when the insulator is used for the fuel cell.

(2) In the insulator of the aspect described above, at least one of the plurality of insulator members may have a wall portion projecting in a direction that intersects with the planar portion from an entire outer edge of the planar portion. According to the insulator of this aspect, since a creeping distance between the current collector and the end member is fully secured, the insulation of the insulator can be improved. Further, since the creeping distance is secured while preventing an increase of an area of the insulator when seen in the stacking direction, an increase of the fuel cell in size can be prevented when the insulator is used for the fuel cell.

(3) In the insulator of the aspect described above, the plurality of insulator members may have a thickness of 0.5 mm or less, respectively. According to the insulator of this aspect, since the thickness of each of the insulator members is thin, the thickness of the insulator as a whole can be reduced, thereby improving the power density of the fuel cell when the insulator is used for the fuel cell.

(4) In the insulator of the aspect described above, the plurality of insulator members may be made of thermoplastic resin, respectively. According to the insulator of this aspect, since the thermoplastic resin is used as a material, the insulator members can easily be fabricated by compression vacuum forming.

(5) In the insulator of the aspect described above, the plurality of insulator members may be fabricated by compression vacuum forming. According to the insulator of this aspect, the thickness of the insulator members can be reduced.

The present invention can also be implemented in other various forms. For example, the invention can be implemented in forms, such as a fuel cell provided with the insulator, a fuel cell system provided with the fuel cell, a vehicle to which the fuel cell system is mounted, a method of manufacturing the insulator.

DESCRIPTION OF THE EMBODIMENTS

A. Embodiment

Figure 1A:
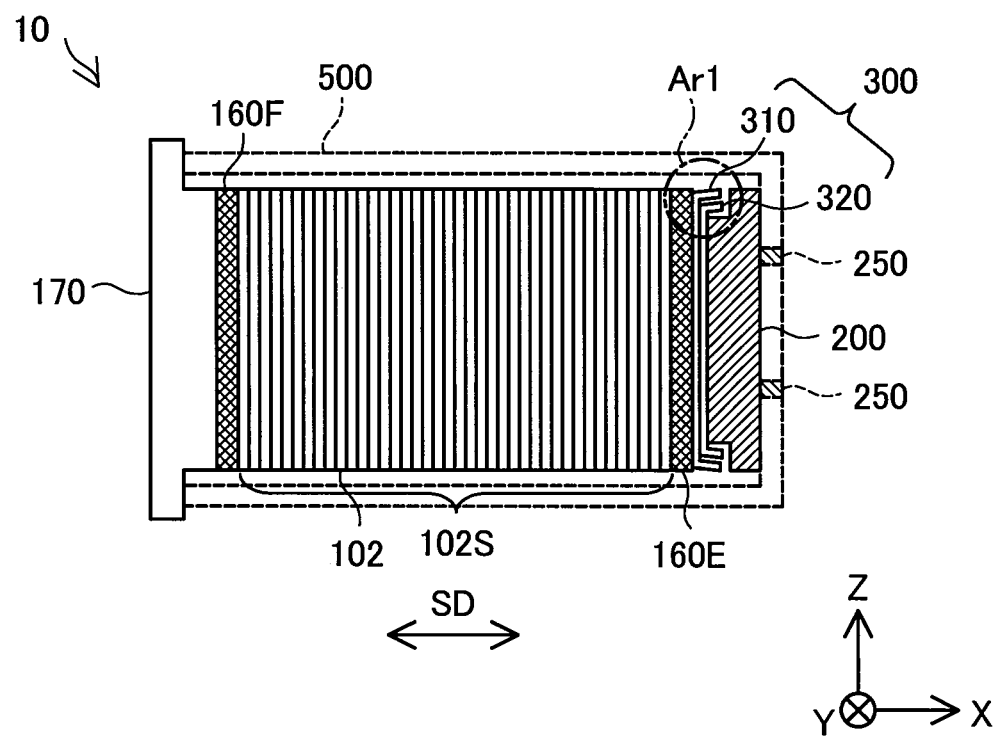
FIG. 1A is a cross-sectional view schematically illustrating a structure of a fuel cell to which an insulator as one embodiment of the present invention is applied.
Figure 1B:
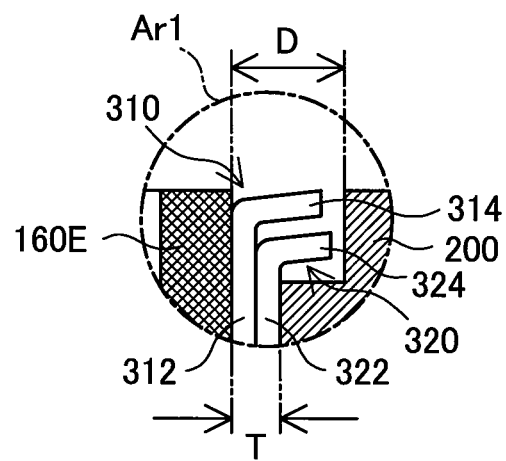
FIG. 1B is an enlarged view of an area circled by a one-point dashed line in FIG. 1A.

FIG. 1A is a cross-sectional view schematically illustrating a structure of a fuel cell to which an insulator as one embodiment of the present invention is applied. FIG. 1B is an enlarged view of an area Ar1 circled by a one-point dashed line in FIG. 1A. A fuel cell 10 is a so-called polymer electrolyte fuel cell, and constitutes a fuel cell system along with a supplying part of reactive gas (fuel gas and oxidizing gas), a supplying part of cooling medium, etc. Such a fuel cell system is, for example, mounted to electric vehicles, etc., and used as a system for supplying power for driving the vehicles. Note that, in FIG. 1A, screws 250, and a case 500 are illustrated by dashed lines for convenience of explanation.

The fuel cell 10 includes a stacked body 102S, a first current collector 160E, a second current collector 160F, an end plate 170, a pressure plate 200, and an insulator 300.

The stacked body 102S has a structure in which a plurality of unit cells 102 are laminated in stacking directions SD.

Each unit cell 102 is comprised of a membrane electrode assembly, a pair of gas diffusion layers which sandwich the membrane electrode assembly, and a pair of separators which sandwich a stacked body comprised of the membrane electrode assembly and the gas diffusion layers. Note that in this embodiment, X-axis is defined parallel to the stacking directions SD of the unit cells 102. Further, in this embodiment, Y-axis is defined parallel to long-side directions of the unit cells 102, and Z-axis is defined parallel to short-side directions of the unit cells 102, where the unit cells have a substantially rectangular shape. Y-axis and Z-axis are perpendicular to X-axis, respectively.

The first current collector 160E is disposed in contact with an end face of the stacked body 102S in +X direction. In this embodiment, the first current collector 160E is made of aluminum. The second current collector 160F is disposed in contact with an end face of the stacked body 102S in −X direction. In this embodiment, the second current collector 160F has a three-layer structure comprised of a titanium layer, an aluminum layer and a titanium layer, and an outer edge of the second current collector 160F is covered with rubber. The first current collector 160E and the second current collector 160F collect generated power from each unit cell 102, and output the collected power to an exterior device through terminals. Note that the first current collector 160E may be formed in a three-layer structure, similar to the second current collector 160F. Further, the two current collectors 160E and 160F may be made of materials other than aluminum and titanium.

The end plate 170 is disposed outside the second current collector 160F in the stacking directions SD. Flow paths for supplying and discharging reactive gas and cooling medium to/from the stacked body 102S are formed inside the end plate 170. A step is formed in a peripheral edge portion of a surface of the end plate 170 in +X direction, and a thinned portion of the step is in contact with an end of the case 500 in −X direction. In this embodiment, the end plate 170 is made of resin material, and has a high insulation performance.

The pressure plate 200 is disposed outside the insulator 300 in the stacking directions SD. A step is formed in a peripheral edge portion of a surface of the pressure plate 200 in −X direction. Thus, the pressure plate 200 has an external shape in which an outer edge portion thereof is thin and a center portion projects in −X direction. A peripheral edge portion (a wall portion, described below) of the insulator 300 is accommodated in the stepped portion. The pressure plate 200 maintains, together with the end plate 170, the stacked state of the stacked body 102S by receiving a load in −X direction from the plurality of screws 250 inserted into holes formed in the case 500 and pressing the stacked body 102S.

The shape of surfaces perpendicular to the stacking directions SD of the plurality of unit cells 102, the first current collector 160E, the second current collector 160F, and the pressure plate 200 is a substantially rectangular shape, respectively and it is oriented so that the long-side directions are parallel to Y-axis.

The insulator 300 is disposed between the first current collector 160E and the pressure plate 200. The insulator 300 includes a first insulator member 310 and a second insulator member 320, having substantially the same external shape. These two insulator members 310 and 320 are disposed so as to be stacked onto each other in the stacking directions SD. The first insulator member 310 is located in −X direction from the second insulator member 320, and is in contact with an end face of the first current collector 160E in +X direction. The second insulator member 320 is located in +X direction from the first insulator member 310, and is in contact with an end face of the pressure plate 200 in −X direction. The insulator 300 electrically insulates the first current collector 160E and the pressure plate 200.

Figure 2:
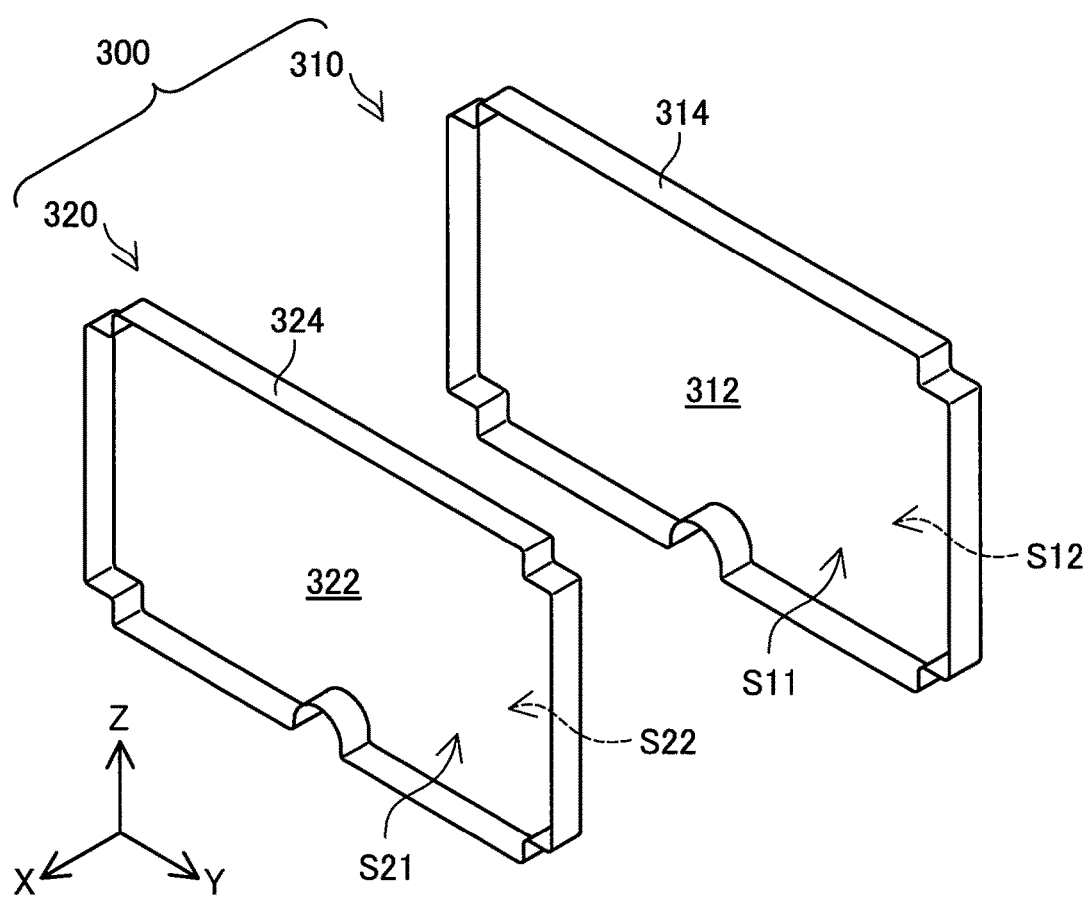
FIG. 2 is an exploded perspective view illustrating a structure of the insulator.

FIG. 2 is an exploded perspective view illustrating a structure of the insulator 300. The first insulator member 310 includes a first planar portion 312 and a first wall portion 314. The first planar portion 312 is a flat sheet-like portion having a substantially rectangular sheet shape. The first planar portion 312 has a substantially the same size of area as that of the end face of the first current collector 160E in +X direction. The first planar portion 312 has a similar plate or sheet shape to the unit cells 102, the first current collector 160E, etc., and recessed portions are formed at four corners and at the center of a lower long side of the substantially rectangular sheet shape. These recessed portions are formed in order to prevent interferences of the insulator 300 with protruded portions of the case 500 and a tension shaft. The first wall portion 314 is formed so as to project substantially in +X direction from the entire outer edge of the first planar portion 312. Here, the first wall portion 314 is formed so as to project substantially in +X direction because a draft angle when fabricating the first wall portion 314 is taken into consideration. The second insulator member 320 also includes a second planar portion 322 and a second wall portion 324, similar to the first insulator member 310. The second planar portion 322 has a similar shape to the first planar portion 312 described above, and the second wall portion 324 has a similar shape to the first wall portion 314 described above.

The first insulator member 310 is stacked onto the second insulator member 320 by contacting a surface S11 of the first planar portion 312 in +X direction with a surface S22 of the second planar portion 322 in −X direction. Here, the first planar portion 312 is formed slightly larger than the second planar portion 322 in dimensions parallel to Y and Z directions. Thus, the first insulator member 310 and the second insulator member 320 can be stacked without interfering mutually. A surface S12 of the first planar portion 312 in −X direction is located so as to oppose to the first current collector 160E, and a surface S21 of the second planar portion 322 in +X direction is located so as to oppose to the pressure plate 200.

Here, the insulation distance between the first current collector 160E and the pressure plate 200 is described with reference to FIG. 1B. In FIG. 1B, a thickness T of the insulator 300 and a creeping distance D are illustrated as the insulation distances. Generally the "creeping distance" is referred to as a distance to which electricity is transmitted through the surface of an insulator between two conductive portions. In this embodiment, the thickness T of the insulator 300 corresponds to a sum total of a thickness of the first insulator member 310 and a thickness of the second insulator member 320. Further, the creeping distance D is equal to a distance in X directions between the first current collector 160E and the thin-walled portion of the pressure plate 200, and is substantially equal to a length (hereinafter, also referred to as "the height") of each of the wall portions 314 and 324 substantially in X directions. This is because a gap between the first wall portion 314 and the second wall portion 324, and gaps between ends of the wall portions 314 and 324 and the thin-walled portion of the pressure plate 200 in +X direction are significantly small, respectively, and these gaps can be substantially ignored. The thickness T and the creeping distance D of the insulator 300 which are required for the insulation can be found based on a voltage of the fuel cell 10.

In this embodiment, the first insulator member 310 and the second insulator member 320 have a thickness of 0.3 mm at any position thereof. Note that the thickness of the first insulator member 310 may differ from the thickness of the second insulator member 320, and their thicknesses may be any thicknesses other than 0.3 mm. However, in terms of reducing the thickness T of the insulator 300, it is preferred that the thicknesses of the first insulator member 310 and the second insulator member 320 are 0.5 mm or less, respectively. In this embodiment, the thickness T of the insulator 300 is 0.6 mm which is a sum total of the thickness of the first planar portion 312 and the thickness of the second planar portion 322. Note that if the thickness T of the insulator 300 required for the insulation can be secured, the sum total of the thicknesses may also be any thicknesses other than 0.6 mm. For example, the thickness T of the insulator 300 (i.e., the sum total of the thicknesses) may exceed the thickness required for the insulation. In this embodiment, the heights of the first wall portion 314 and the second wall portion 324 are 8 mm, respectively. Note that the height of the first wall portion 314 may differ from the height of the second wall portion 324. If the heights of the first wall portion 314 and the second wall portion 324 correspond to dimensions which can secure the creeping distance D required for the insulation, the heights may also be any dimensions other than 8 mm.

The first insulator member 310 and the second insulator member 320 are both fabricated by compression vacuum forming, using polyethylene terephthalate (PET) as their material. Note that the material may also be any thermoplastic resins, such as polyethylene naphthalate (PEN), polyether ether ketone (PEEK), instead of PET. However, it is preferred to use PET as the material in terms of a reduction in the manufacturing cost and an improvement in a durability against hydrolysis. Note that if the material can be fabricated in a desired shape, it may also be a thermosetting resin. Further, the first insulator member 310 and the second insulator member 320 may be fabricated by other forming methods, such as heat pressing, instead of the compression vacuum forming.

In this embodiment, the first current collector 160E corresponds to a "current collector" in the claims. The pressure plate 200 corresponds to an "end member" in the claims. Further, the first insulator member 310 and the second insulator member 320 correspond to a "plurality of insulator members" in the claims.

The insulator 300 of this embodiment described above is comprised of the two members, the first insulator member 310 and the second insulator member 320, and the two members are used in the stacked manner in which the sheet-like planar portions 312 and 322 contact mutually. Thus, the thickness T (the length in X directions) of the insulator 300 can be thinner than conventional insulators, thereby improving the power density of the fuel cell 10. Here, the term "power density" of the fuel cell 10 as used herein refers to energy which can be outputted by the fuel cell 10 per unit mass or unit volume.

In addition, even if a defected part due to a pinhole or mixing of conductive material is caused in one of the insulator members, there is a very low possibility that the other insulator member has a defected part at the same position when seen in the stacking direction SD. Thus, compared with a case where the insulator 300 is comprised of one member, a generation of a poor insulation resulting from a generation of the pinhole and a poor insulation resulting from mixing of the conductive material with the insulator material when manufacturing the insulator 300 (the first insulator member 310 and the second insulator member 320) can be prevented, thereby improving the reliability of the insulator 300. As described above, since the insulator 300 of this embodiment is used, the power density of the fuel cell 10 can be improved, and the generation of the poor insulation can be prevented.

Generally, although the conventional insulator is manufactured by cutting or injection molding, the thickness of about 3 mm or more is needed for manufacturing the insulator by cutting, and the thickness of about 2 mm or more is needed for manufacturing by injection molding. Thus, it is difficult to manufacture a thin insulator by the cutting or injection molding. On the other hand, according to the insulator 300 of this embodiment, the first insulator member 310 and the second insulator member 320 are fabricated by the compression vacuum forming. Thus, compared with the manufacturing by cutting or injection molding, the thickness of the insulator 300 can be thinner and the power density of the fuel cell 10 can be improved. Further, since the thickness of the insulator 300 is thinner than the conventional insulator, the material cost and the resources can be reduced. Further, since the cutting is not required when manufacturing the insulator 300 (the first insulator member 310 and the second insulator member 320), a generation of a crack in the insulator 300 can be prevented, thereby preventing a reduction in yield. Further, since the thermoplastic resin is used for the material, the insulator can easily be manufactured by the compression vacuum forming, thereby simplifying the manufacturing process. Further, since PET is used as the thermoplastic resin, the insulator 300 can be manufactured at low cost and the durability against hydrolysis can be improved.

Further, the first insulator member 310 and the second insulator member 320 are provided with the first wall portion 314 and the second wall portion 324, respectively. Thus, compared with a structure which does not have the first wall portion 314 and the second wall portion 324, the creeping distance D between the first current collector 160E and the pressure plate 200 can fully be secured, thereby improving the insulation of the insulator 300. Further, the first wall portion 314 and the second wall portion 324 are formed in the direction substantially perpendicular to the first planar portion 312 and the second planar portion 322 and are accommodated in the stepped portion in the outer edge of the pressure plate 200. Thus, the creeping distance D can be secured while preventing an increase in the area of the insulator 300 when seen in the stacking direction SD, thereby preventing an increase of the fuel cell 10 in size. Further, since the area of the first planar portion 312 is slightly larger than the area of the second planar portion 322, the interference between the first planar portion 312 and the second planar portion 322 due to their thicknesses can be prevented when stacking the first insulator member 310 and the second insulator member 320.

B. Modifications

B-1. Modification 1

Although the insulator 300 is comprised of the two members, the first insulator member 310 and the second insulator member 320 in the embodiment described above, the insulator 300 may also be comprised by three or more members. According to such a structure, the generation of the poor insulation resulting from the generation of the pinhole, or the poor insulation resulting from the mixing of the conductive material with the material can further be prevented.

B-2. Modification 2

In the embodiment described above, although the first insulator member 310 and the second insulator member 320 are provided with the first wall portion 314 and the second wall portion 324, respectively, the present invention is not limited to this structure. At least one of the first wall portion 314 and the second wall portion 324 may be omitted. Also in such a structure, the creeping distance D can be secured, for example, by increasing the sizes of the two planar portions 312 and 322, and/or stacking more number of insulator members.

B-3. Modification 3

Although the first wall portion 314 and the second wall portion 324 are formed so as to project in the direction substantially perpendicular to the first planar portion 312 and the second planar portion 322, respectively in the embodiment described above, the present invention is not limited to this structure. They may be formed so as to project at arbitrary angles with respect to the two planar portions 312 and 322, respectively. The angle between the first planar portion 312 and the first wall portion 314 may differ from the angle between the second planar portion 322 and the second wall portion 324. However, the angles are preferred to be designed so that the two wall portions 314 and 324 may not interfere mutually when the first insulator member 310 and the second insulator member 320 are stacked. The height of the first wall portion 314 may differ from the height of the second watt portion 324. That is, generally, at least one of the plurality of insulator members may be provided with the wall portion formed so as to project in a direction which intersects with the planar portion from the entire outer edge of the planar portion.

B-4. Modification 4

Although the first wall portion 314 and the second wall portion 324 are formed so as to project toward the pressure plate 200 in the embodiment described above, the present invention is not limited to this structure. The first wall portion 314 and the second wall portion 324 may also be formed so as to project toward the first current collector 160E. In other words, the surface S12 of the first planar portion 312 in −X direction may be disposed so as to oppose to the pressure plate 200 and the surface S21 of the second planar portion 322 in +X direction may be disposed so as to oppose to the first current collector 160E. Further, either one of the first wall portion 314 and the second wall portion 324 may be formed toward the pressure plate 200, and the other one may be formed toward the first current collector 160E. Also by this structure, the generation of the poor insulation resulting from the generation of the pinhole and the poor insulation resulting from the mixing of the conductive material with the material can be prevented, while securing the creeping distance D.

B-5. Modification 5

Although the insulator 300 is disposed between the first current collector 160E and the pressure plate 200 in the embodiment described above, the present invention is not limited to this structure. Here, it is assumed that the fuel cell 10 is provided with another arbitrary end member, such as an end plate, instead of the pressure plate 200. In such a case, the insulator 300 may be disposed between the arbitrary end member and the first current collector 160E, instead of between the pressure plate 200 and the first current collector 160E. That is, generally, the insulator 300 may be disposed between the current collector disposed at one end in the stacking directions of the stacked body having the plurality of stacked unit cells, and the end member disposed outside of the current collector in the stacking directions.

The present invention is not limited to the embodiment and the modifications described above, and can be implemented in various structures without departing from the scope of the invention. For example, technical features in the embodiment and the modifications corresponding to technical features of each aspect cited in the section of "SUMMARY OF THE INVENTION," can suitably be substituted and/or combined in order to address some or all of the subjects described above, or in order to obtain some or all of the effects described above. The technical features can suitably be deleted if they are not described as essential matters in this specification.

What is claimed is:

1. A fuel cell, comprising:
   a stacked body having a plurality of stacked unit cells;
   a current collector disposed in contact with one end of the stacked body in stacking directions;
   an insulator disposed outside from the current collector in the stacking directions; and
   an end member disposed outside the insulator in the stacking directions,
   wherein the insulator includes a plurality of insulator members, each having a sheet-like planar portion,
   wherein the plurality of insulator members which are stacked onto each other at the planar portions,
   wherein an insulator member, which is included in the plurality of insulator members and positioned outside of the plurality of insulator members, faces to the current collector,
   wherein each of the plurality of insulator members has a wall portion projecting in a direction that intersects with the planar portion from an entire outer peripheral edge of the planar portion surrounding the planar portion,
   wherein the end member includes a central portion protruding toward the insulator in the stacking directions and a stepped portion composed of a thinner part than the central portion in the end member and provided on a peripheral edge of the end member, and
   wherein the wall portions of each insulator members are accommodated in a space formed by the stepped portion.

2. The fuel cell in accordance with claim 1, wherein the plurality of insulator members have a thickness of 0.5 mm or less, respectively.

3. The fuel cell in accordance with claim 1, wherein the plurality of insulator members are made of thermoplastic resin, respectively.

4. The fuel cell in accordance with claim 3, wherein the plurality of insulator members are fabricated by compression vacuum forming.

* * * * *